(12) United States Patent
Rumreich et al.

(10) Patent No.: US 8,624,980 B2
(45) Date of Patent: Jan. 7, 2014

(54) APPARATUS AND METHOD FOR INDICATING THE DETECTED DEGREE OF MOTION IN VIDEO

(75) Inventors: Mark Francis Rumreich, Indianapolis, IN (US); Ronald Thomas Keen, Indianapolis, IN (US)

(73) Assignee: Thomson Licensing, Boulogne-Billancourt (FR)

(*) Notice: Subject to any disclaimer, the term of this patent is extended or adjusted under 35 U.S.C. 154(b) by 1158 days.

(21) Appl. No.: 11/659,774

(22) PCT Filed: Aug. 10, 2004

(86) PCT No.: PCT/US2004/026032
§ 371 (c)(1),
(2), (4) Date: Feb. 8, 2007

(87) PCT Pub. No.: WO2006/022705
PCT Pub. Date: Mar. 2, 2006

(65) Prior Publication Data
US 2007/0268409 A1 Nov. 22, 2007

(51) Int. Cl.
*H04N 17/00* (2006.01)
*H04N 5/14* (2006.01)

(52) U.S. Cl.
USPC .......................... 348/184; 348/701; 348/180

(58) Field of Classification Search
USPC ......... 348/701, 607, 448, 452, 450, 180, 184, 348/553, 569, 687, 678, 169; 345/581, 589, 345/647, 473, 474, 690, 63, 87, 89, 102; 382/107
See application file for complete search history.

(56) References Cited

U.S. PATENT DOCUMENTS

| | | | | |
|---|---|---|---|---|
| 4,409,615 A | * | 10/1983 | McMann et al. | 378/98.2 |
| 4,847,909 A | * | 7/1989 | Shibata | 382/107 |
| 4,926,361 A | * | 5/1990 | Ohtsubo et al. | 348/607 |
| 5,063,438 A | * | 11/1991 | Faroudja | 348/610 |
| 5,083,203 A | * | 1/1992 | Ko et al. | 348/701 |
| 5,119,409 A | * | 6/1992 | Nields et al. | 378/106 |
| 5,185,664 A | * | 2/1993 | Darby | 348/620 |
| 5,225,898 A | | 7/1993 | Imai et al. | |
| 5,519,451 A | * | 5/1996 | Clatanoff et al. | 348/606 |
| 5,548,346 A | * | 8/1996 | Mimura et al. | 348/738 |
| 5,579,054 A | * | 11/1996 | Sezan et al. | 348/452 |

(Continued)

FOREIGN PATENT DOCUMENTS

| | | | |
|---|---|---|---|
| GB | 2 266 638 A | 11/1993 | |
| GB | 2 343 317 A | 5/2000 | |

(Continued)

OTHER PUBLICATIONS

International Search Report Dated May 3, 2006.

*Primary Examiner* — Victor Kostak
(74) *Attorney, Agent, or Firm* — Robert D. Shedd; Brian J. Cromarty

(57) ABSTRACT

A video apparatus such as a television signal receiver enables a video display that readily indicates the detected degree of a video attribute such as motion and/or other video attribute present in the video display. According to an exemplary embodiment, the video apparatus includes first circuitry operative to receive video data. Second circuitry is operative to enable a video display corresponding to the video data. The video display includes first and second video attributes. The first video attribute varies in proportion to a detected degree of the second video attribute.

6 Claims, 4 Drawing Sheets

(56) References Cited

U.S. PATENT DOCUMENTS

| | | | |
|---|---|---|---|
| 5,625,412 A * | 4/1997 | Aciu et al. | 348/222.1 |
| 5,734,362 A * | 3/1998 | Eglit | 345/89 |
| 5,796,437 A * | 8/1998 | Muraji et al. | 348/452 |
| 5,872,602 A * | 2/1999 | Johnson | 348/620 |
| 6,118,489 A * | 9/2000 | Han et al. | 348/452 |
| 6,181,382 B1 * | 1/2001 | Kieu et al. | 348/459 |
| 6,252,632 B1 * | 6/2001 | Cavallaro | 348/585 |
| 6,489,989 B1 | 12/2002 | Shapiro et al. | |
| 6,580,812 B1 * | 6/2003 | Harrington | 382/107 |
| 6,670,963 B2 * | 12/2003 | Osberger | 345/629 |
| 6,734,916 B1 | 5/2004 | Sims | |
| 6,756,954 B2 * | 6/2004 | Yamamoto et al. | 345/87 |
| 7,180,529 B2 * | 2/2007 | Covannon et al. | 345/690 |
| 7,256,755 B2 * | 8/2007 | Ohta et al. | 345/68 |
| 2001/0015768 A1 * | 8/2001 | Shin et al. | 348/452 |
| 2002/0047818 A1 * | 4/2002 | Yamamoto et al. | 345/87 |
| 2004/0086046 A1 * | 5/2004 | Ma et al. | 375/240.16 |
| 2006/0153475 A1 * | 7/2006 | Ruggiero | 382/276 |
| 2006/0209957 A1 * | 9/2006 | Riemens et al. | 375/240.16 |
| 2006/0244759 A1 * | 11/2006 | Kempf | 345/611 |
| 2006/0268179 A1 * | 11/2006 | Renner et al. | 348/666 |

FOREIGN PATENT DOCUMENTS

| | | |
|---|---|---|
| JP | 3-242797 | 10/1991 |
| JP | 11-318829 | 11/1999 |
| KR | 20040047541 | 6/2004 |
| WO | WO 00/28498 | 5/2000 |

* cited by examiner

APPARATUS AND METHOD FOR INDICATING THE DETECTED DEGREE OF MOTION IN VIDEO

This application claims the benefit, under 35 U.S.C. §365 of International Application PCT/US2004/026032, filed Aug. 10, 2004, which was published in accordance with PCT Article 21(2) on Mar. 2, 2006 in English.

FIELD OF THE INVENTION

The present invention generally relates to video apparatuses such as television signal receivers, and more particularly, to an apparatus and method for enabling a video display that readily indicates the detected degree of a video attribute such as motion and/or other video attribute present in the video display.

BACKGROUND INFORMATION

Video apparatuses such as television signal receivers often include motion detectors for adaptive video processing to facilitate functions such as frequency upconversion, data compression or line/frame combing. High quality motion detection for video signals such as National Television Standards Committee (NTSC) signals often involves sophisticated processing to correctly identify actual motion without falsely detecting motion due to the alternating phase of chrominance with respect to luminance on alternating video frames. As a result, motion detectors often include several control registers whose settings may be adjusted in order to optimize the performance of the motion detector for a particular application or condition (e.g., noisy video). Because of the complexity of motion detection, and the potentially large number of control registers associated with a given motion detector, it may be difficult for application circuit designers to optimize the control register settings of a motion detector. Accordingly, there is a need for a convenient means for enabling application circuit designers to determine the optimal control register settings for a motion detector in the product design environment.

One conventional approach for enabling application circuit designers to determine the control register settings for a motion detector is to overlay points of detected motion upon a video display. According to this conventional approach, the pixels in a video display that represent points of motion are replaced with black pixels. That is, those pixels of a video display that represent points of motion are displayed in black, while those pixels that do not represent points of motion are displayed in accordance with their original level of luminance. This conventional approach, however, is less than optimal since it uses single threshold and replacement values, and therefore indicates only whether motion is present at a given pixel, but does not indicate the degree of motion present at the given pixel. As a result, this approach is deficient in that it does not provide application circuit designers with a good indication of the degree of detected motion in a video display.

Accordingly, there is a need for an apparatus and method which avoids the foregoing problems, and thereby enables a video display that readily indicates the detected degree of motion and/or other video attribute present in the video display. The present invention may address these and/or other issues.

SUMMARY OF THE INVENTION

In accordance with an aspect of the present invention, a video apparatus is disclosed. According to an exemplary embodiment, the video apparatus comprises means for receiving video data and means for enabling a video display corresponding to the video data. The video display includes first and second video attributes. The first video attribute varies in proportion to a detected degree of the second video attribute.

In accordance with another aspect of the present invention, a method for enabling a video display is disclosed. According to an exemplary embodiment, the method comprises steps of receiving video data, and enabling the video display corresponding to the video data. The video display includes first and second video attributes. The first video attribute varies in proportion to a detected degree of the second video attribute.

In accordance with yet another aspect of the present invention, a television signal receiver is disclosed. According to an exemplary embodiment, the television signal receiver comprises first circuitry operative to receive video data, and second circuitry operative to enable a video display corresponding to the video data. The video display includes first and second video attributes. The first video attribute varies in proportion to a detected degree of the second video attribute.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
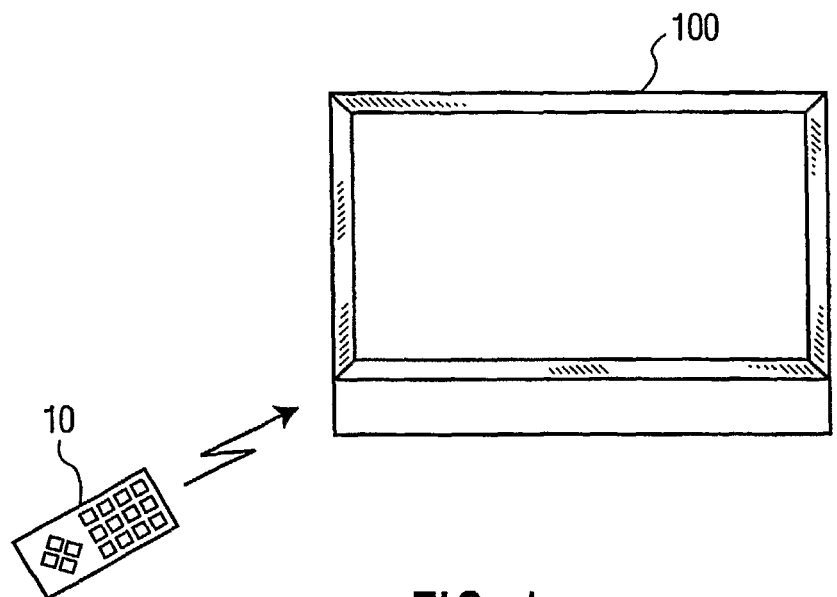
FIG. 1 is a diagram of an exemplary environment suitable for implementing the present invention.

Referring now to the drawings, and more particularly to FIG. 1, an exemplary environment suitable for implementing the present invention is shown. The exemplary environment of FIG. 1 comprises user input means such as user input device 10, and a video apparatus 100 that enables a video display function. According to an exemplary embodiment, video apparatus 100 is embodied as a television signal receiver, but may be embodied as any device or apparatus that enables a video display function, regardless of whether it includes an integrated display device.

User input device 10 is operative to generate and output control signals that control the operation of video apparatus 100 and/or other devices. According to an exemplary embodiment, user input device 10 includes a plurality of input keys and outputs control signals in a wired and/or wireless (e.g., via infrared or radio frequency (RF) link, etc.) manner responsive to user depression of its input keys. User input device 10 may for example be embodied as a hand-held remote control device, wired and/or wireless keyboard, integrated control panel of video apparatus 100, and/or other user input device.

Video apparatus 100 is operative to receive signals including audio, video and/or data signals in analog and/or digital format from one or more signal sources such as terrestrial, cable, satellite, internet and/or other signal sources and to provide aural and/or visual outputs corresponding to these received signals. According to an exemplary embodiment, video apparatus 100 enables a video display including a first video attribute (e.g., luminance, etc.) that is readily discernible by a user from viewing the video display, and a second video attribute (e.g., motion, noise, etc.) that is not readily discernible by the user from viewing the video display. According to this exemplary embodiment, the first video attribute varies in proportion to a detected degree of the second video attribute and thereby enables a user such as an application circuit designer to adjust and select one or more control settings related to the second video attribute. For example, an application circuit designer may use the visually observed degree of luminance in the video display as an indicator of the degree of motion present in the video display. In this manner, the application circuit designer may adjust various motion control settings of video apparatus 100 until the desired optimal control settings are identified. Further details regarding these aspects of the present invention will be provided later herein.

Figure 2:
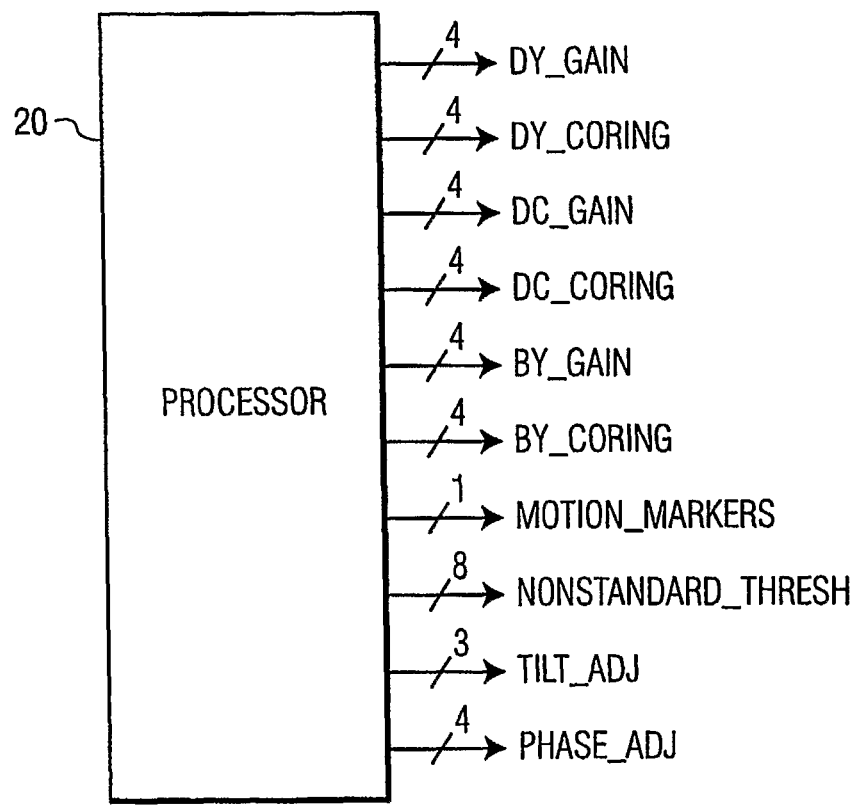
FIG. 2 is a block diagram of a processor included in the video apparatus of FIG. 1 according to an exemplary embodiment of the present invention.

Referring to FIG. 2, a block diagram of a processor 20 included in video apparatus 100 of FIG. 1 according to an exemplary embodiment of the present invention is shown. As indicated in FIG. 2, processor 20 is operative to output various control signals including a DY_GAIN signal, a DY_CORING signal, a DC_GAIN signal, a DC_CORING signal, a BY_GAIN signal, a BY_CORING signal, a MOTION_MARKERS signal, a NONSTANDARD THRESH signal, a TILT_ADJ signal, and a PHASE_ADJ signal. According to an exemplary embodiment, the foregoing control signals may be output from processor 20 to other elements of video apparatus 100 via an inter-integrated circuit (I2C) bus responsive to key inputs entered via user input device 10. In FIG. 2, the number above each signal line represents the bit width of each signal according to an exemplary embodiment. The "*" symbol indicates that the signal is unsigned.

According to an exemplary embodiment, the DY_GAIN signal, the DY_CORING signal, the DC_GAIN signal, the DC_CORING signal, the BY_GAIN signal, and the BY_CORING signal represent control signals for a motion detection function of video apparatus 100. As will be described later herein, the foregoing signals may be set to optimal values by an application circuit designer during a test mode of video apparatus 100. According to this exemplary embodiment, the foregoing control signals represent the following. The DY_GAIN signal indicates a luminance gain sensitivity value used for motion detection. The DY_CORING signal indicates a luminance quantization sensitivity value used for motion detection. The DC_GAIN signal indicates a chrominance gain sensitivity value used for motion detection. The DC_CORING signal indicates a chrominance quantization sensitivity value used for motion detection. The BY_GAIN signal indicates a luminance gain sensitivity value used for motion detection for luminance signals near the chrominance pass band (e.g., 3.58 MHz, etc.). The BY_CORING signal indicates a luminance quantization sensitivity value used for motion detection for luminance signals near the chrominance pass band (e.g., 3.58 MHz, etc.). According to an exemplary embodiment, the foregoing control signals are used as control "knobs" by an application circuit designer to adjust the motion detection control settings of video apparatus 100. That is, the values of these control signals may be adjusted by the application circuit designer during a test mode of video apparatus 100 in order to select the combination of values which produce the most optimal video display results. The foregoing control signals are examples only. In practice, other control signals may be used for motion detection, and the number of such control signals may be a matter of design choice.

Also according to an exemplary embodiment, the MOTION_MARKERS signal output from processor 20 is used to turn a test mode of video apparatus 100 for motion detection on and off. The NONSTANDARD THRESH signal indicates a threshold value used to determine whether a received video signal is a nonstandard video signal. For example, a video signal provided to video apparatus 100 from an external device such as a video cassette recorder (VCR), video game box, or other device may be considered a nonstandard video signal. The TILT_ADJ signal and the PHASE_ADJ signal are used to adjust the chrominance magnitude and group delay symmetry of received video signals, respectively.

Figure 3:
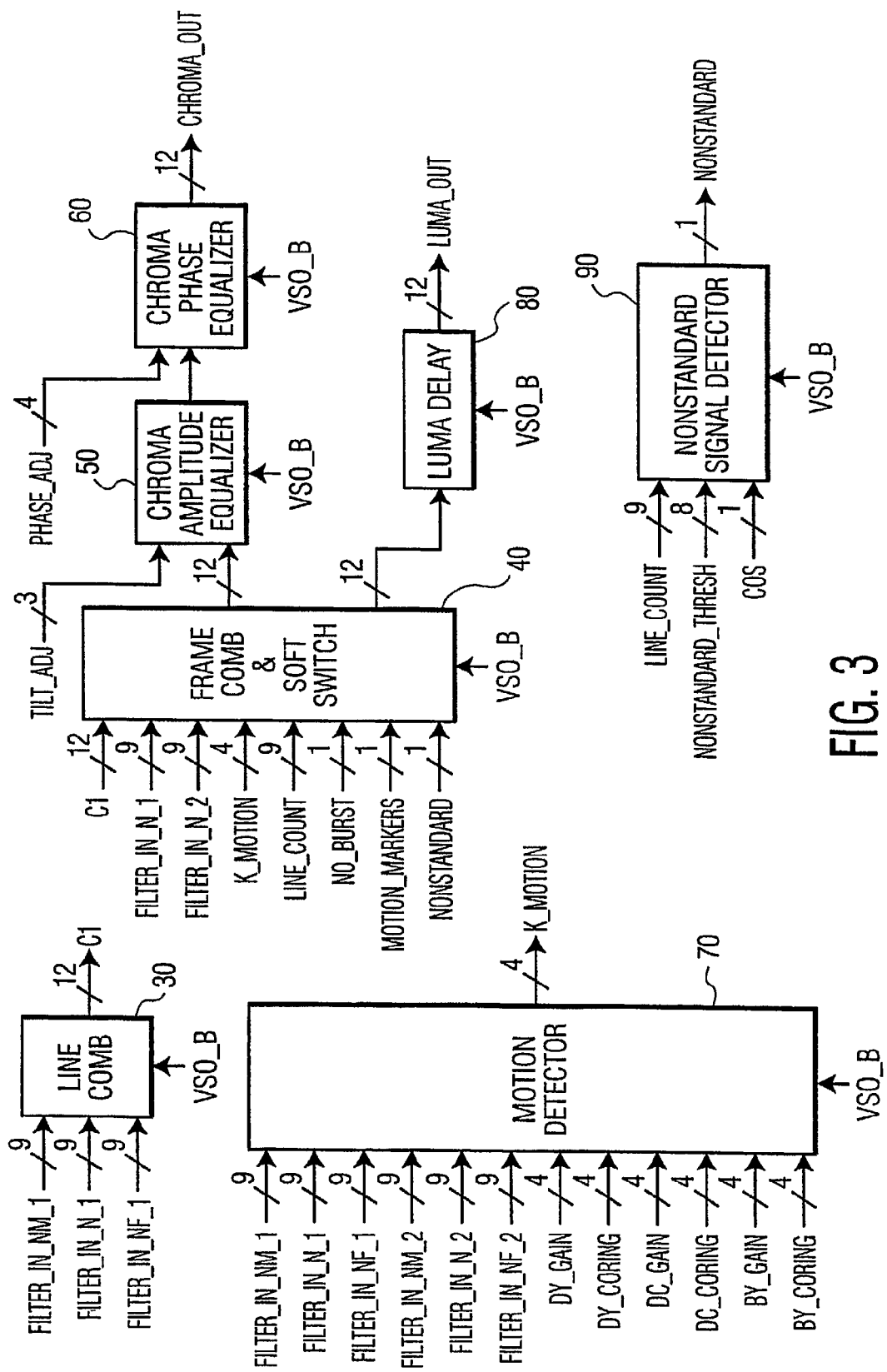
FIG. 3 is a block diagram of signal processing apparatus including a line comb, frame comb and motion detector included in the video apparatus of FIG. 1 according to an exemplary embodiment of the present invention.

Referring to FIG. 3, a block diagram of signal processing apparatus including a line comb, frame comb and motion detector included in the video apparatus of FIG. 1 according to an exemplary embodiment of the present invention is shown. In particular, the signal processing apparatus of FIG. 3 includes line combing means such as line comb 30, frame combing and switching means such as frame comb and soft switch 40, chrominance amplitude equalizing means such as chroma amplitude equalizer 50, chrominance phase equalizing means such as chroma phase equalizer 60, motion detecting means such as motion detector 70, luminance delay means such as luma delay 80, and nonstandard signal detecting means such as nonstandard signal detector 90. According to an exemplary embodiment, the foregoing elements of FIG. 3 are included on a single integrated circuit (IC), but may also be included on a plurality of ICs. In FIG. 3, the number above each signal line represents the bit width of each signal according to an exemplary embodiment. The "*" symbol indicates that the signal is unsigned.

Line comb 30 is operative to perform a line combing function. According to an exemplary embodiment, line comb 30 performs an adaptive line combing function in accordance with a clock enabling signal VSO_B using three adjacent video line signals FILTER_IN_NM_1 (e.g., line N−1), FILTER_IN_N_1 (e.g., line N), and FILTER_IN_NP_1 (e.g., line N+1) for a given frame (e.g., frame 1) to produce a combined chrominance signal, C1. The foregoing video signals may for example be provided to line comb 30 from intermediate frequency (IF) processing and/or video delay circuitry (not shown in FIGS.) of video apparatus 100. Clock enabling signal VSO_B may be provided from other circuitry of video apparatus 100 (not shown in FIGS.).

Frame comb and soft switch 40 is operative to perform functions including frame combing and switching functions. According to an exemplary embodiment, frame comb and soft switch 40 performs an adaptive frame combing function in accordance with clock enabling signal VSO_B using the C1 signal, the FILTER_IN_N_1 signal, a FILTER_IN_N_2 signal, a K_MOTION signal, a LINE_COUNT signal, a NO_BURST signal, the MOTION_MARKERS signal, and a NONSTANDARD signal, to thereby generate adaptively combed chrominance and luminance output signals. According to this exemplary embodiment, the foregoing signals represent the following. The C1 signal is provided from line comb 30, as previously described herein. The FILTER_IN_N_1 signal is a video signal for line N of a frame (e.g., frame 1). The FILTER_IN_N_2 signal is a video signal for line N of a next frame (e.g., frame 2). The FILTER_IN_N_1 signal and the FILTER_IN_N_2 signal may for example be provided from IF processing and/or video delay circuitry (not shown in FIGS.) of video apparatus 100. The K_MOTION signal is provided from motion detector 70 and controls an amount of blending between line combing and frame combing (e.g., all line combing, 50% line combing/50% frame combing, all frame combing, etc.). The LINE_COUNT signal indicates the current video line number. The NO_BURST signal indicates whether chrominance is present. The LINE_COUNT signal and the NO_BURST signal may for example be provided to frame comb and soft switch 40 from processing circuitry (not shown in FIGS.) included on the same IC as the elements shown in FIG. 3. The MOTION_MARKERS signal is provided from processor 20 of FIG. 2, and is used to turn a test mode of video apparatus 100 for motion detection on and off. The NONSTANDARD signal is provided from nonstandard signal detector 90 and indicates whether a received video signal is a nonstandard video signal (e.g., a video signal provided to video apparatus 100 from an external device such as a VCR, video game box, or other device). Further exemplary details regarding frame comb and soft switch 40 will be provided later herein.

Chroma amplitude equalizer 50 is operative to perform a chrominance amplitude equalization function. According to an exemplary embodiment, chroma amplitude equalizer 50 performs the chrominance amplitude equalization function on the adaptively combed chrominance output signal provided from frame comb and soft switch 40 in accordance with the TILT_ADJ signal provided from processor 20 FIG. 2 and clock enabling signal VSO_B to thereby generate an amplitude equalized chrominance signal.

Chroma phase equalizer 60 is operative to perform a chrominance phase equalization function. According to an exemplary embodiment, chroma phase equalizer 60 performs the chrominance phase equalization function on the amplitude equalized chrominance signal provided from chroma amplitude equalizer 50 in accordance with the PHASE_ADJ signal provided from processor 20 of FIG. 2 and clock enabling signal VSO_B to thereby generate a chrominance output signal, CHROMA_OUT, which is provided for further processing (e.g., NTSC decoding, etc.).

Motion detector 70 is operative to perform a motion detection function. According to an exemplary embodiment, motion detector 70 performs a motion detection function in accordance with clock enabling signal VSO_B using video signals including the FILTER_IN_NM_1 signal (e.g., line N−1, frame 1), the FILTER_IN_N_1 signal (e.g., line N, frame 1), the FILTER_IN_NP_1 signal (e.g., line N+1, frame 1), a FILTER_IN_NM_2 signal (e.g., line N−1, frame 2), the FILTER_IN_N_2 signal (e.g., line N, frame 2), and a FILTER_IN_NP_2 signal (e.g., line N+1, frame 2), as well as control signals including the DY_GAIN signal, the DY_CORING signal, the DC_GAIN signal, the DC_CORING signal, the BY_GAIN signal, and the BY_CORING signal provided from processor 20 of FIG. 2, to thereby generate the K_MOTION signal. As previously indicated herein, the K_MOTION signal controls an amount of blending between line combing and frame combing (e.g., all line combing, 50% line combing/50% frame combing, all frame combing, etc.). According to an exemplary embodiment, the less motion detected by motion detector 70, the more frame combing and less line combing is performed. Conversely, the more motion detected by motion detector 70, the less frame combing and more line combing is performed.

Luma delay 80 is operative to perform a luminance delay function. According to an exemplary embodiment, luma delay 80 applies a predetermined delay to the adaptively combed luminance output signal provided from frame comb and soft switch 40 in accordance with clock enabling signal VSO_B to thereby generate a delayed luminance signal, LUMA_OUT, which is provided for further processing (e.g., NTSC decoding, etc.).

Nonstandard signal detector 90 is operative to perform a nonstandard signal detection function. According to an exemplary embodiment, nonstandard signal detector 90 performs the nonstandard signal detection function in accordance with clock enabling signal VSO_B using the LINE_COUNT signal, the NONSTANDARD_THRES signal, and a COS signal to thereby generate the NONSTANDARD signal which is provided to frame comb and soft switch 40. The COS signal indicates the phase of the chrominance subcarrier, and may for example be provided to nonstandard signal detector 90 from processing circuitry (not shown in FIGS.) included on the same IC as the elements shown in FIG. 3. As previously indicated herein, the NONSTANDARD signal indicates whether a received video signal is a nonstandard video signal (e.g., a video signal provided to video apparatus 100 from an external device such as a VCR, video game box, or other device) based on the NONSTANDARD_THRESH signal provided from processor 20 of FIG. 2.

Figure 4:
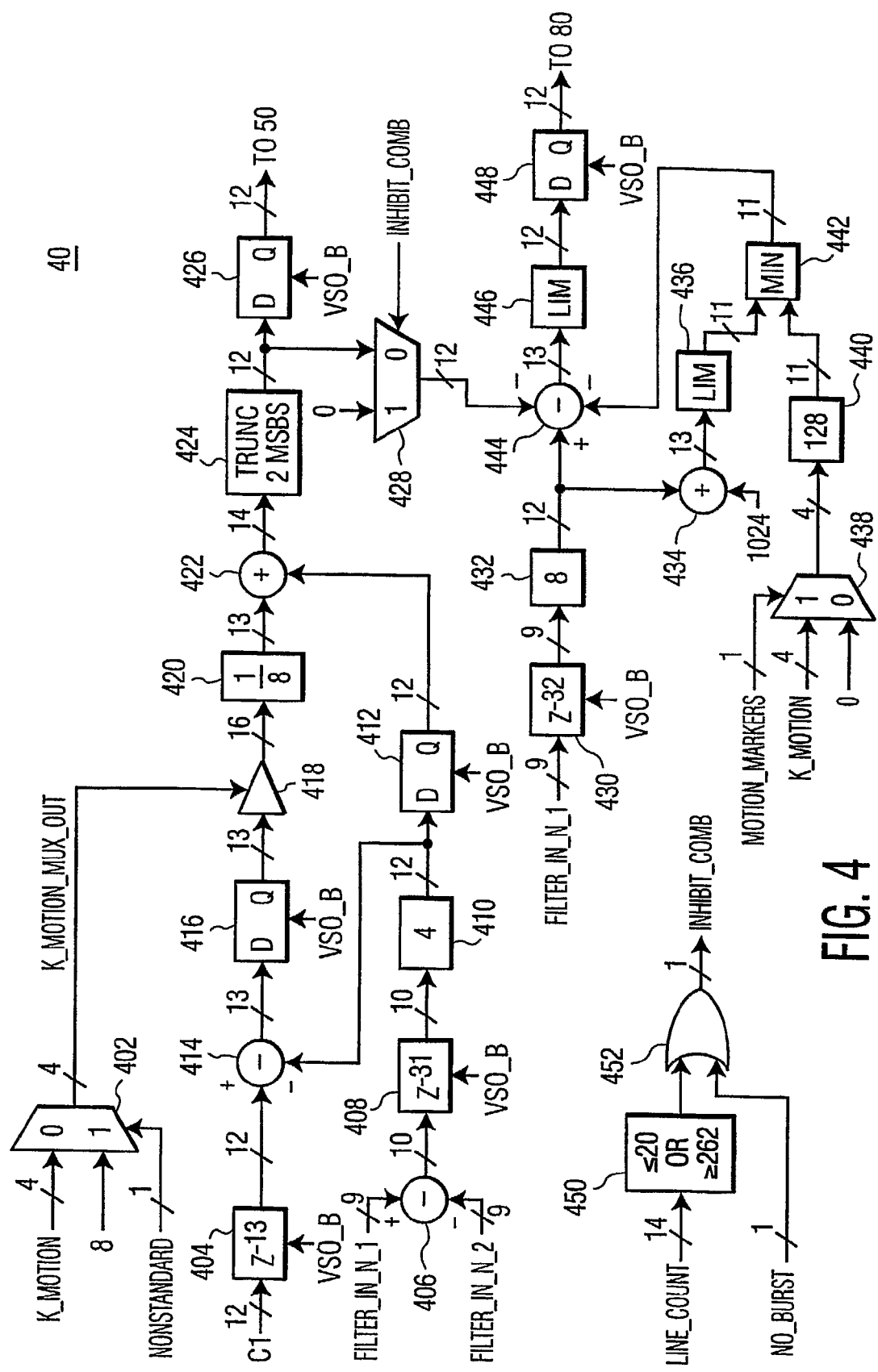
FIG. 4 is a diagram providing further details of the frame comb and soft switch of FIG. 3 according to an exemplary embodiment of the present invention.

Referring to FIG. 4, a diagram providing further details of frame comb and soft switch 40 of FIG. 3 according to an exemplary embodiment of the present invention is shown. As shown in FIG. 4, frame comb and soft switch 40 comprise first multiplexing means such as multiplexer 402, first delay means such as delay 404, first subtracting means such as subtractor 406, second delay means such as delay 408, first multiplying means such as multiplier 410, first flip-flop means such as D-type flip-flop 412, second subtracting means such as subtractor 414, second flip-flop means such as D-type flip-flop 416, amplifying means such as amplifier 418, second multiplying means such as multiplier 420, first adding means such as adder 422, truncating means such as truncator 424, third flip-flop means such as D-type flip-flop 426, second multiplexing means such as multiplexer 428, third delay means such as delay 430, third multiplying means such as multiplier 432, second adding means such as adder 434, first limiting means such as limiter 436, third multiplexing means such as multiplexer 438, fourth multiplying means such as multiplier 440, minimizing means such as minimizer 442, third subtracting means such as subtractor 444, second limiting means such as limiter 446, fourth flip-flop means such as D-type flip-flop 448, gating means such as vertical interval gate 450, and logic means such as OR gate 452. In FIG. 4, the number above each signal line represents the bit width of each signal according to an exemplary embodiment. The "*" symbol indicates that the signal is unsigned.

Multiplexer 402 is operative to output a K_MOTION_MUX_OUT signal responsive to the NONSTANDARD signal provided from nonstandard signal detector 90 of FIG. 3. According to an exemplary embodiment, the K_MOTION_MUX_OUT signal is a control signal that controls the amount of line and/or frame combing to be performed. For example, if the K_MOTION_MUX_OUT signal exhibits a value of 8, only line combing (and no frame combing) is performed. Conversely, if the K_MOTION_MUX_OUT signal exhibits a value of 0, only frame combing (and no line combing) is performed. If the K_MOTION_MUX_OUT signal exhibits a value from 1 to 7 a corresponding combination of frame combing and line combing is performed.

Delay 404 is operative to apply a predetermined delay to the C1 signal provided from line comb 30 of FIG. 3 to thereby generate a delayed signal. According to an exemplary embodiment, delay 404 is clocked in accordance with clock enabling signal VSO_B, and applies a delay of 13 clock cycles to the C1 signal. Subtractor 406 is operative to subtract the FILTER_IN_N__2 signal from the FILTER_IN_N__1 signal to generate a difference signal, and thereby operates as a fixed frame comb. Delay 408 is operative to apply a predetermined delay to the difference signal provided from subtractor 406 to thereby generate a delayed signal. According to an exemplary embodiment, delay 408 is clocked in accordance with clock enabling signal VSO_B, and applies a delay of 31 clock cycles to the difference signal provided from subtractor 406. Multiplier 410 is operative to multiply the delayed signal provided from delay 408 by a value of 4 to thereby generate a multiplied signal. D-type flip-flop 412 is operative to receive and output the multiplied signal provided from multiplier 410 in accordance with clock enabling signal VSO_B.

Subtractor 414 is operative to subtract the multiplied signal provided from multiplier 410 from the delayed signal provided from delay 404 to thereby generate a difference signal. D-type flip-flop 416 is operative to receive and output the difference signal provided from subtractor 414 in accordance with clock enabling signal VSO_B. Amplifier 418 is operative to amplify the output signal provided from D-type flip-flop 416 responsive to the K_MOTION_MUX_OUT signal to thereby generate an amplified signal. Multiplier 420 is operative to multiply the amplified signal provided from amplifier 418 by a value of ⅛ to thereby generate a multiplied signal. Adder 422 is operative to add the multiplied signal provided from multiplier 420 to the output signal provided from D-type flip-flop 412 to thereby generate a sum signal. Truncator 424 is operative to truncate the 2 most significant bits (MSBs) from the sum signal provided from adder 422 to thereby generate a truncated signal. D-type flip-flop 426 is operative to receive and output the truncated signal provided from truncator 424 in accordance with clock enabling signal VSO_B. The output signal from D-type flip-flop 426 is provided to chroma amplitude equalizer 50 of FIG. 3.

Multiplexer 428 is operative to output either the truncated signal provided from truncator 424 or a logic 0 signal responsive to an INHIBIT_COMB signal. Delay 430 is operative to apply a predetermined delay to the FILTER_IN_N__1 signal to thereby generate a delayed signal. According to an exemplary embodiment, delay 430 is clocked in accordance with clock enabling signal VSO_B, and applies a delay of 32 clock cycles to the FILTER_IN_N__1 signal. Multiplier 432 is operative to multiply the delayed signal provided from delay 430 by a value of 8 to thereby generate a multiplied signal. Adder 434 is operative to add the multiplied signal provided from multiplier 432 to a value of 1024 to thereby generate a sum signal. Limiter 436 is operative to limit the sum signal provided from adder 434 to a predetermined range of values, which may be matter of design choice.

Multiplexer 438 is operative to output either the K_MOTION signal provided from motion detector 70 of FIG. 3 or a logic 0 signal responsive to the MOTION_MARKERS signal provided from processor 20 of FIG. 2. Multiplier 440 is operative to multiply the output signal provided from multiplexer 438 by a value of 128 to thereby generate a multiplied signal. Minimizer 442 is operative to receive the output signal from limiter 436 and the multiplied signal from multiplier 440 and passes the signal having the lowest value. Subtractor 444 is operative to subtract the output signal of minimizer 442 and the output signal of multiplexer 428 from the multiplied signal provided from multiplier 432 to thereby generate a difference signal. Limiter 446 is operative to limit the difference signal provided from subtractor 444 to a predetermined range of values, which may be matter of design choice. D-type flip-flop 448 is operative to receive and output the output signal of limiter 444 in accordance with clock enabling signal VSO_B. The output signal from D-type flip-flop 448 is provided to luma delay 80 of FIG. 3.

Vertical interval gate 450 is operative to detect the vertical blanking interval (VBI) of a video signal. According to an exemplary embodiment, vertical interval gate 450 outputs a logic 1 signal if the LINE_COUNT signal represents a value that is less than or equal to 20 or greater than or equal to 262. OR gate 452 is operative to logically OR the output signal of vertical interval gate 450 with the NO_BURST signal to thereby generate the INHIBIT_COMB signal which is provided to multiplexer 428.

In FIG. 4, it is noted that adder 434, limiter 436, and minimizer 442 are used to prevent the generation of a motion marking luminance signal (i.e., the output signal from D-type flip-flop 448) that is darker than approximately 0 IRE. Accordingly, these elements of FIG. 4 prevent the motion marking luminance signal from interfering with the operation of the sync separation circuitry of an NTSC decoder (not shown in FIGS.), and also causes the motion marking luminance signal to vary in proportion to the detected degree of motion in a video display. As used herein, the phrase "in proportion to" may for example refer to being directly proportional, inversely proportional, step-wise proportional, and/or otherwise proportional in a manner having more than 2 states.

Figure 5:
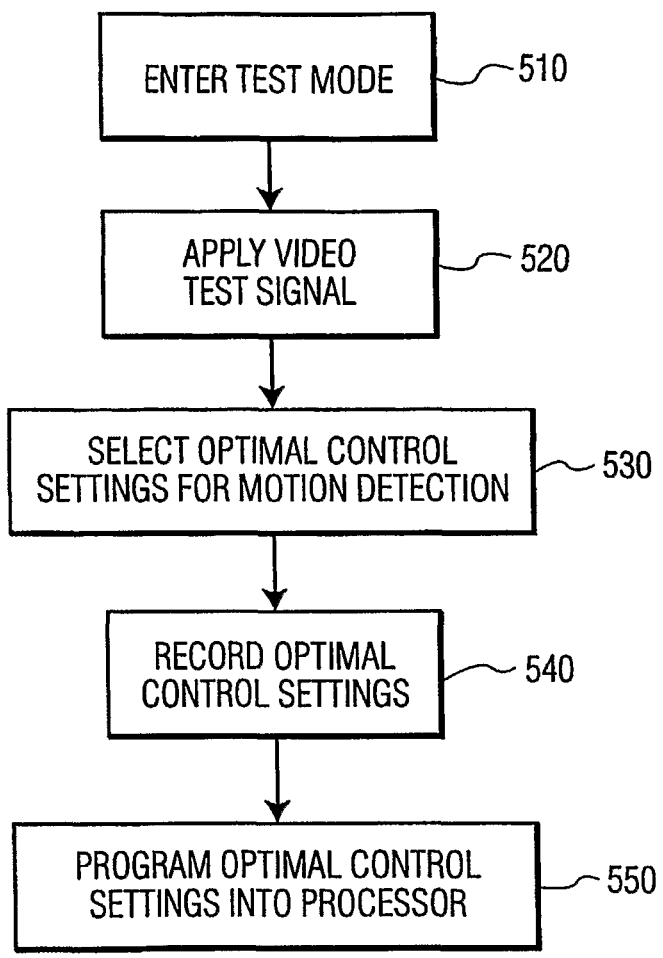
FIG. 5 is a flowchart illustrating steps according to an exemplary embodiment of the present invention.

To facilitate a better understanding of the present invention, an example will now be provided. Referring to FIG. 5, a flowchart 500 illustrating steps according to an exemplary embodiment of the present invention is shown. For purposes of example and explanation, the steps of FIG. 5 will be described with reference to video apparatus 100 described herein. The steps of FIG. 5 are exemplary only, and are not intended to limit the present invention in any manner.

At step 510, video apparatus 100 enters a test mode. According to an exemplary embodiment, video apparatus 100 may enter the test mode at step 510 responsive to a predetermined sequence of key inputs provided by an application circuit designer via user input device 10. The specific sequence of key inputs used to enter the test mode may be a matter of design choice. However, it is preferable that the sequence of key inputs be sufficiently complex and unique so that a consumer does not inadvertently enter the key input sequence while using user input device 10 to control video apparatus 100. According to an exemplary embodiment, processor 20 of FIG. 2 outputs the MOTION_MARKERS signal in a predetermined logic state to indicate entry of the test mode at step 510. Video apparatus 100 may also enter the test mode at step 510 in other ways, such as by connecting it to an external computer (not shown in FIGS.) and entering one or more predetermined inputs via the external computer.

At step 520, a video test signal is applied to video apparatus 100. According to an exemplary embodiment, a predetermined video test signal is applied to video apparatus 100 through one of its video inputs, and the video test signal causes video apparatus 100 to enable a video display corresponding to the video test signal. The specific type of video test signal used at step 520 may be a matter of design choice. However, according to an exemplary embodiment, it is preferable that the video test signal provide some degree of motion so that the application circuit designer can identify and select optimal control settings for motion detection.

At step 530, an application circuit designer selects the optimal control settings for motion detection. According to an exemplary embodiment, the application circuit designer provides inputs to video apparatus 100 via user input device 10 to thereby adjust the values of the DY_GAIN signal, the DY_CORING signal, the DC_GAIN signal, the DC_CORING signal, the BY_GAIN signal, and the BY_CORING signal output from processor 20 of FIG. 2 and select the optimal control settings for motion detection at step 530. As previously indicated herein, the foregoing signals represent control signals for motion detector 70 of FIG. 3 according to an exemplary embodiment of the present invention. Of course, other control signals may be used according to the present invention, and the number of such control signals may be a matter of design choice.

Also previously indicated herein, video apparatus 100 enables a video display including a first video attribute (e.g., luminance, etc.) that is readily discernible by a user from viewing the video display, and a second video attribute (e.g., motion, noise, etc.) that is not readily discernible by the user from viewing the video display. Moreover, the first video attribute varies in proportion to a detected degree of the second video attribute. Accordingly, the video display produced from the video test signal may include a degree of luminance that varies on a pixel-by-pixel basis in proportion to the detected degree of motion in the video display. This enables the application circuit designer to use the visually observed degree of luminance in the video display as an indicator of the degree of motion present in the video display. Using this video display, the application circuit designer may adjust and ultimately select at step 530 the values of the DY_GAIN signal, the DY_CORING signal, the DC_GAIN signal, the DC_CORING signal, the BY_GAIN signal, and the BY_CORING signal that he or she deems to produce the optimal video display.

At step 540, the application circuit designer records the optimal control settings selected at step 530. According to an exemplary embodiment, the application circuit designer may record the optimal control settings at step 540 by simply writing down or otherwise recording the values for the DY_GAIN signal, the DY_CORING signal, the DC_GAIN signal, the DC_CORING signal, the BY_GAIN signal, and the BY_CORING signal that he or she deems to produce the optimal video display.

At step 550, the optimal control settings are programmed into processor 20 of video apparatus 100. According to an exemplary embodiment, the optimal control settings are programmed into processor 20 at step 550 by programming the selected values for the DY_GAIN signal, the DY_CORING signal, the DC_GAIN signal, the DC_CORING signal, the BY_GAIN signal, and the BY_CORING signal into processor 20. The programming of such values into processor 20 may be performed using conventional techniques which are known in the art.

As described herein, the present invention provides an apparatus and method for enabling a video display that readily indicates the detected degree of a video attribute such as motion and/or other video attribute present in the video display. The present invention may be applicable to various apparatuses, either with or without a display device. Accordingly, the phrases "video apparatus" and "television signal receiver" as used herein may refer to systems or apparatuses including, but not limited to, television sets, computers or monitors that include a display device, and systems or apparatuses such as set-top boxes, VCRs, digital versatile disk (DVD) players, video game boxes, personal video recorders (PVRs), computers or other apparatuses that may not include a display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A video apparatus, comprising:
   means for receiving video data, said video data comprising motion;
   means for detecting said motion;
   means for enabling a video display of a pixel within a location of said motion in response to said detected motion to indicate a location of said detected motion, said video display including a first video attribute and said motion, wherein said first video attribute includes luminance; and
   wherein said first video attribute of said pixel varies in proportion to a detected degree of said detected motion.

2. The video apparatus of claim 1, wherein said video display enables selection of one or more control settings related to said detected motion.

3. A method for enabling a video display, comprising steps of:
   receiving video data, said video data comprising motion;
   detecting said motion;
   enabling said video display of in a pixel within a location of said motion in response to said detected motion to indicate a location of said detected motion, said video display including a first video attribute and said motion, wherein said first video attribute includes luminance; and
   wherein said first video attribute of said pixel varies in proportion to a detected degree of said detected motion.

4. The method of claim 3, wherein said video display enables selection of one or more control settings related to said detected motion.

5. A television signal receiver, comprising:
   first circuitry operative to receive video data and detect motion within said video data;
   second circuitry operative to enable a video display of in a pixel within a location of said motion in response to said detected motion to indicate a location of said detected motion, said video display including a first video attribute and said motion, wherein said first video attribute includes luminance; and
   wherein said first video attribute of said pixel varies in proportion to a detected degree of said detected motion.

6. The television signal receiver of claim 5, wherein said video display enables selection of one or more control settings related to said detected motion.

* * * * *